US009122072B2

(12) United States Patent
Hartshorn et al.

(10) Patent No.: US 9,122,072 B2
(45) Date of Patent: Sep. 1, 2015

(54) SEALING SYSTEM FOR USE IN VARIABLE FOCUS LENSES

(71) Applicant: Dow Corning Corporation, Midland, MI (US)

(72) Inventors: Richard Andrew Hartshorn, London (GB); Edward Henry Goodwin, London (GB); Richard Edward Taylor, Oxford (GB); Jeremy Stimson, London (GB); Maja Kecman, London (GB)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 14/281,076

(22) Filed: May 19, 2014

(65) Prior Publication Data

US 2014/0253872 A1    Sep. 11, 2014

Related U.S. Application Data

(63) Continuation of application No. PCT/US2013/032192, filed on Mar. 15, 2013.

(60) Provisional application No. 61/624,868, filed on Apr. 16, 2012.

(51) Int. Cl.
    *G02C 5/00*     (2006.01)
    *G02C 11/00*    (2006.01)
    *F16K 7/04*     (2006.01)
    *G02C 7/08*     (2006.01)
    *F16J 15/06*    (2006.01)

(52) U.S. Cl.
    CPC ............... *G02C 5/001* (2013.01); *F16J 15/061* (2013.01); *F16K 7/04* (2013.01); *G02C 7/085* (2013.01); *G02C 11/00* (2013.01)

(58) Field of Classification Search
    CPC ........ G02C 11/00; G02C 5/001; G02C 5/008; F16K 7/04
    USPC ............... 351/41, 55, 158, 159.68; 251/7
    See application file for complete search history.

(56) References Cited

U.S. PATENT DOCUMENTS

| 355,714 | A |   | 1/1887 | Reinmann |
|---|---|---|---|---|
| 4,099,700 | A | * | 7/1978 | Young ............................. 251/7 |
| 4,932,629 | A | * | 6/1990 | Rodomista et al. ............... 251/4 |
| 4,960,259 | A | * | 10/1990 | Sunnanvader et al. ............ 251/7 |
| 5,092,856 | A |   | 3/1992 | Johnston |
| 5,229,885 | A | * | 7/1993 | Quaglia ....................... 359/665 |
| 6,618,208 | B1 | * | 9/2003 | Silver .......................... 359/666 |
| 2003/0141470 | A1 | * | 7/2003 | Igarashi ........................... 251/5 |

FOREIGN PATENT DOCUMENTS

EP    1211445    6/2002

OTHER PUBLICATIONS

International Search Report of PCT/US2013/032192 dated Aug. 13, 2013.

* cited by examiner

*Primary Examiner* — Darryl J Collins
(74) *Attorney, Agent, or Firm* — Brinks Gilson & Lione

(57) ABSTRACT

The present disclosure provides a sealing device for use in variable focus lenses that includes a guide member having at least one internal cavity and a passageway intersecting the internal cavity. A pinch member is slidably engaged within the internal cavity of the guide member and a portion of the pinch member slides across the passageway and into a portion of the internal cavity to deform and seal a fluid tube extending through the passageway. A set of adjustable eyeglasses employing the sealing device is also provided.

22 Claims, 16 Drawing Sheets

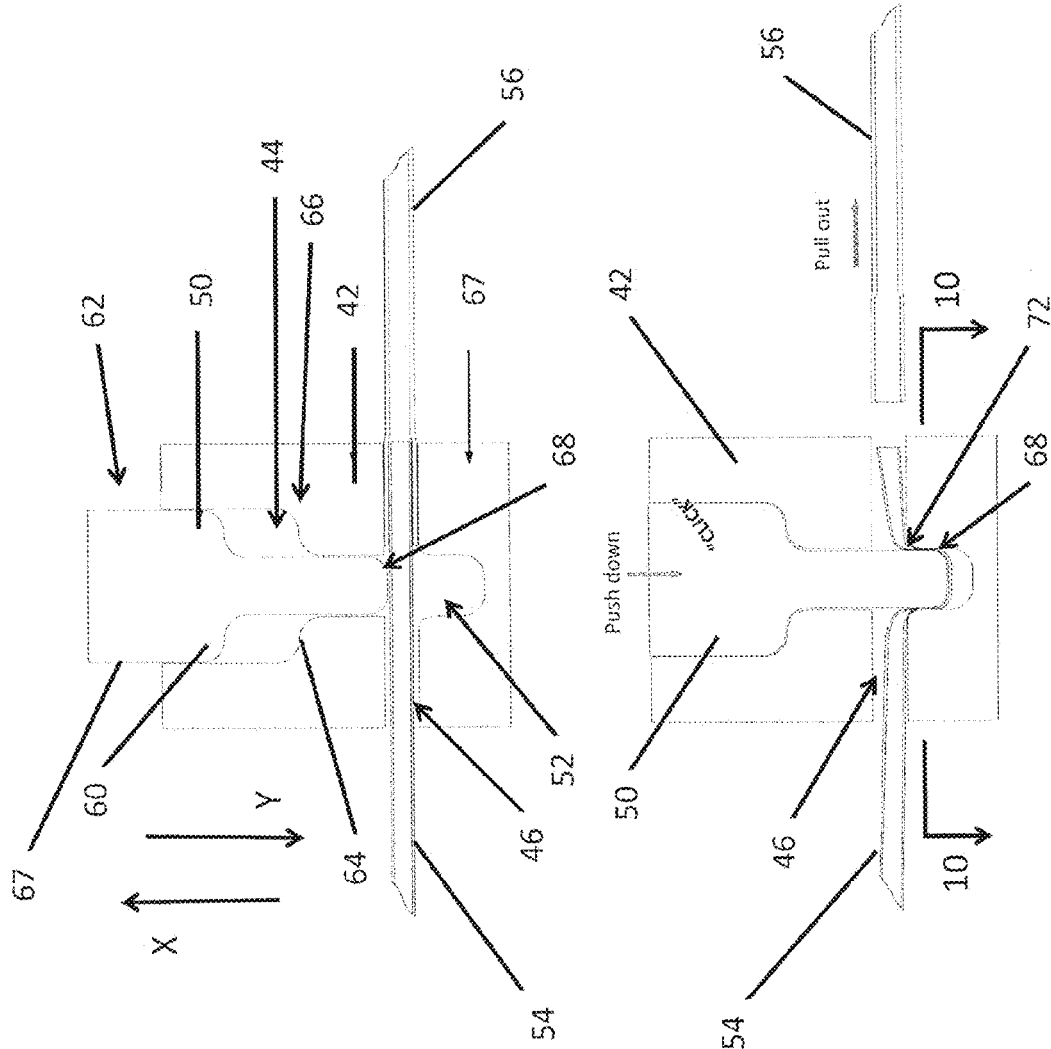

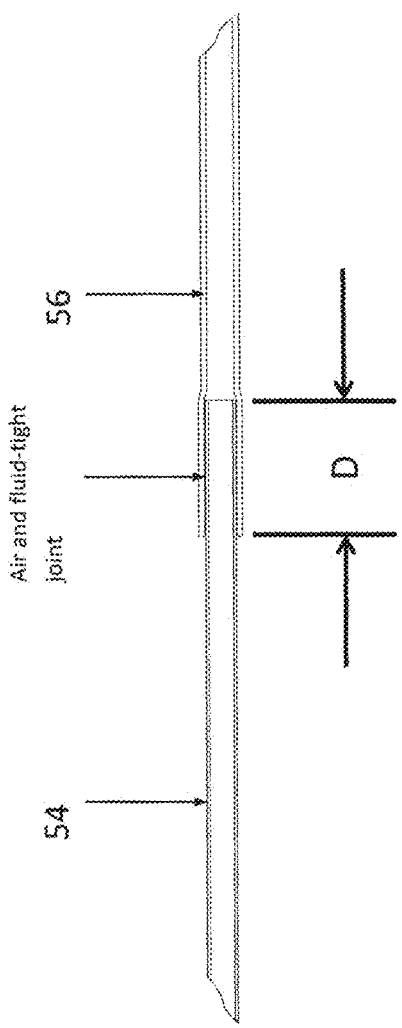

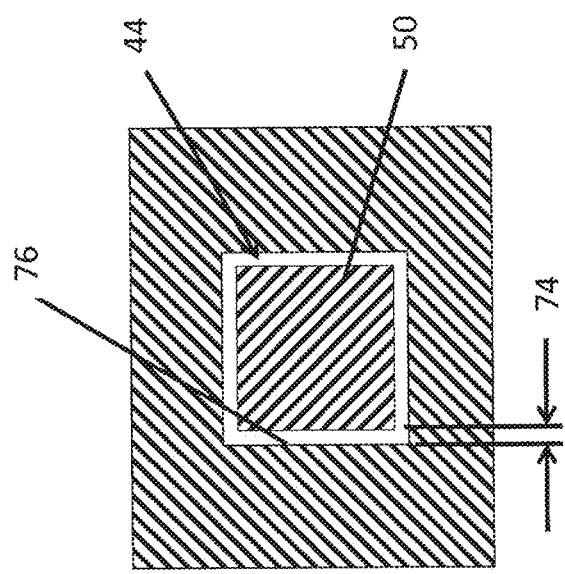

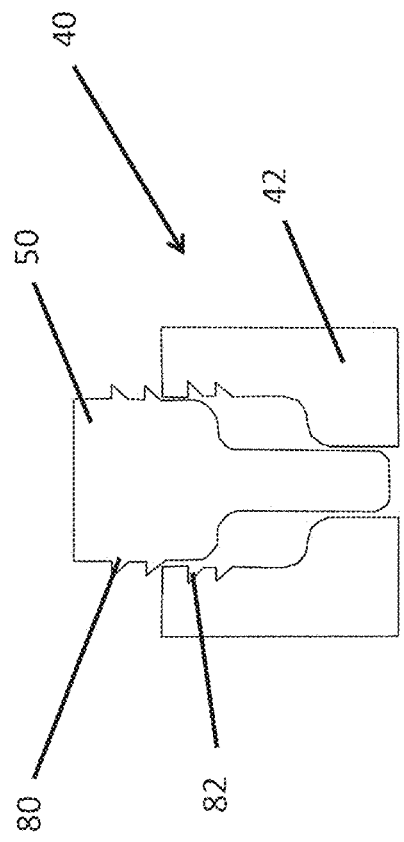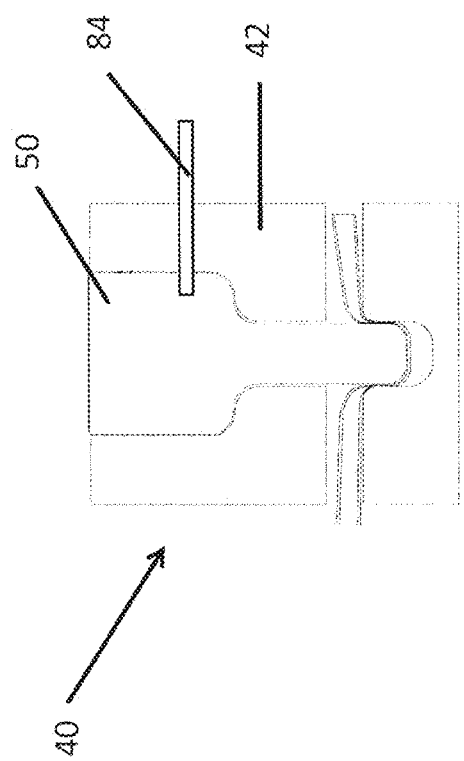
FIG. 11a
FIG. 11b

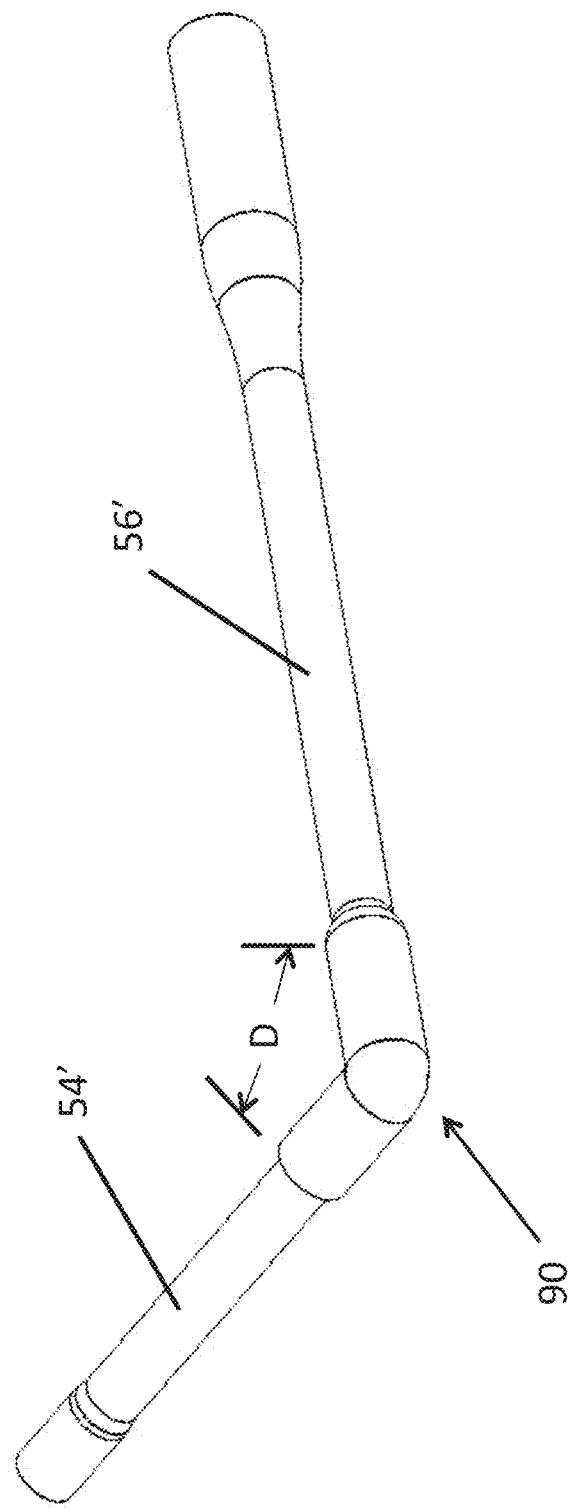

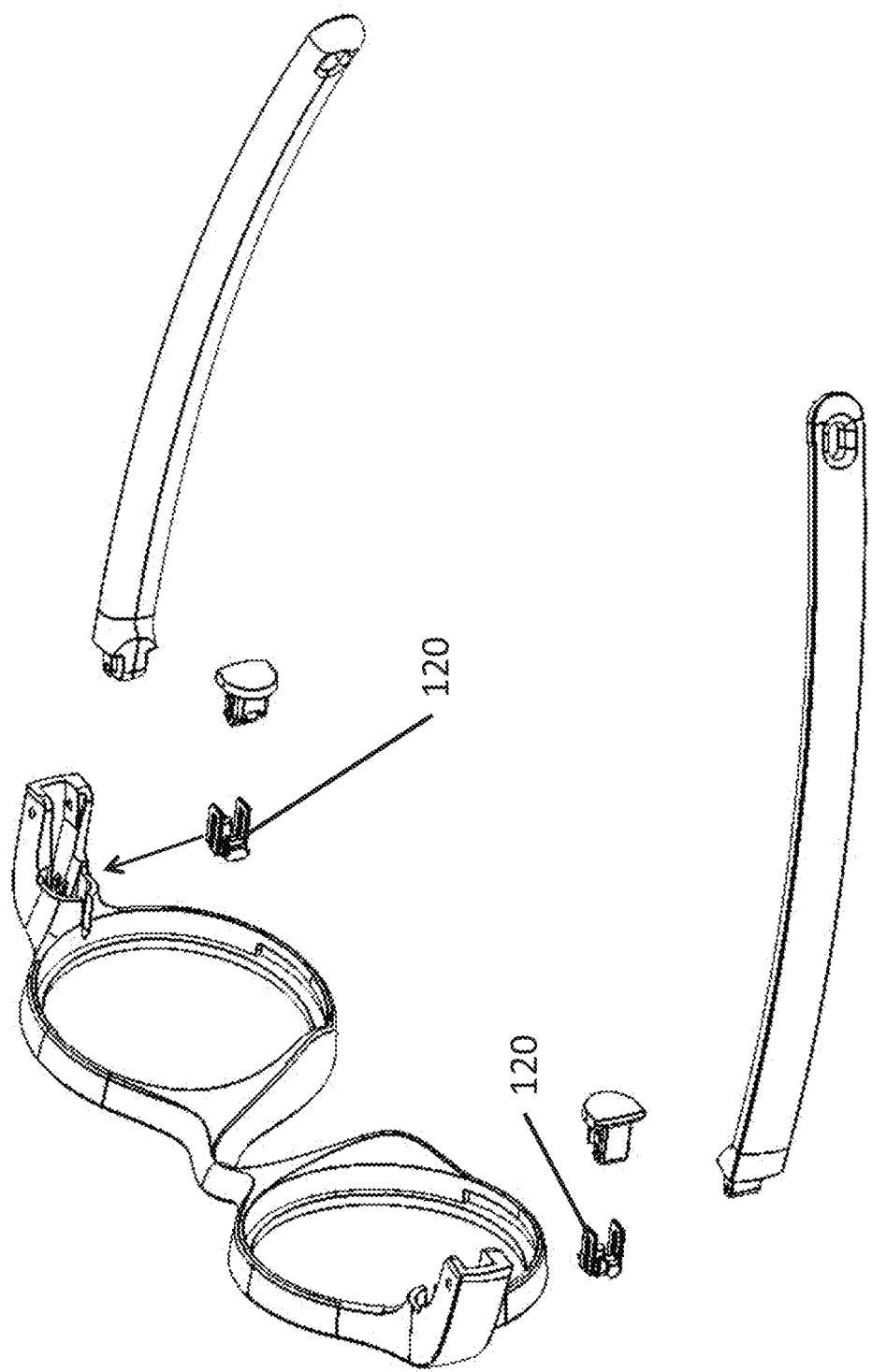

US 9,122,072 B2

SEALING SYSTEM FOR USE IN VARIABLE FOCUS LENSES

CROSS REFERENCE TO RELATED APPLICATIONS

This application is a continuation of PCT Application Serial No. PCT/US2013/032192 filed Mar. 15, 2013, designating the United States and published in English, which claims the benefit of the filing date under 35 U.S.C. §119(e) of U.S. Provisional Application No. 61/624,868 filed Apr. 16, 2012, the entire contents of each of which are hereby incorporated herein by reference.

FIELD

The present disclosure relates generally to variable focus lenses. More specifically, the disclosure relates to devices for sealing fluid-filled variable focus lenses.

BACKGROUND

The statements in this section merely provide background information related to the present disclosure and may not constitute prior art.

Fluid-filled adjustable eyeglasses are known in the art and generally include lenses that are varied in optical power by adjusting pressure of the fluid within the lenses, in order to suit the unique vision correction needs of individual users/wearers. These fluid-filled adjustable eyeglasses are advantageous in many ways. For example, one model of the eyeglasses can suit the needs of a large number of wearers, which simplifies logistical and storage challenges in remote or underdeveloped regions. In these regions, efficient distribution is enabled with fluid-filled adjustable eyeglasses without the need for a complex and expensive infrastructure required for conventional eyeglasses.

Additionally, corrective eyeglasses can be provided in one sitting, without the wait and return trip for a prescription set of conventional eyeglasses. Moreover, fluid-filled eyeglasses can be provided by laypersons with minimal training, simply by providing a testing and dispensing protocol, thus eliminating the need for a certified optometrist in many cases. This scenario has substantial benefits in remote or underdeveloped regions where access to professional care and funding is severely limited.

Adolescents and young adults are often overlooked when it comes to the design and distribution of corrective eyeglasses. The majority of both conventional prescription eyeglasses and fluid-filled eyeglasses are typically designed for the average adult. As a result, adolescents and young adults often use eyeglasses that are not fitted properly or are not adjusted to provide the proper optical power, and thus their vision needs remain a challenge.

SUMMARY

In one form of the present disclosure, a sealing device is provided that comprises a guide member having at least one internal cavity and a passageway intersecting the internal cavity. A pinch member is slidably engaged within the internal cavity of the guide member and a portion of the pinch member slides across the passageway and into a portion of the internal cavity to deform and seal a fluid tube extending through the passageway. Various forms of the sealing device are provided, as set forth in the detailed description and claims below.

In another form, a set of adjustable eyeglasses is provided that comprises a frame member, two side arms secured to the frame member, two fluid-filled variable lenses disposed within the frame member, two adjuster mechanisms removably secured to a portion of the adjustable eyeglasses, and two sets of connecting tubes extending from the adjuster mechanisms through the frame and into the fluid-filled variable lenses, each set of connecting tubes comprising a first tube disposed within a second tube and defining an interference fit there between. Two sealing devices are disposed at opposed ends of the frame member, the sealing devices each comprising a guide member having at least one internal cavity and a passageway intersecting the internal cavity, and a pinch member slidably engaged within the internal cavity of the guide member. A portion of the pinch member slides across the passageway to deform and seal the first connecting tube extending through the passageway and to allow for removable detachment of the second connecting tube. Various forms of the set of adjustable eyeglasses are also provided, as set forth in the detailed description and claims that follow.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 8a is a side cross-sectional view of one form of a sealing device in an open position and constructed in accordance with the teachings of the present disclosure;

FIG. 8b is a side cross-sectional view of the sealing device of FIG. 8a in a closed position and in accordance with the teachings of the present disclosure;

FIG. 9 is a side cross-sectional view of two connecting tubes constructed in accordance with the teachings of the present disclosure;

FIG. 10 is a cross-sectional view, taken along line 10-10 of FIG. 8b, illustrating one form of a guide member and pinch member constructed according to the teachings of the present disclosure;

FIG. 11a is an alternate form of the sealing device having an extension and a recess, and more specifically a barb configuration, and constructed in accordance with the teachings of the present disclosure;

FIG. 11b is yet another form of the sealing device having an external locking device and being constructed in accordance with the teachings of the present disclosure;

FIG. 13a is a perspective view of another form of a first connecting tube and a second connecting tube constructed in accordance with the teachings of the present disclosure;

FIG. 15 is an exploded view of a portion of the eyeglasses in another form, having a metal component to reduce required geometric tolerances, and constructed in accordance with the teachings of the present disclosure.

DETAILED DESCRIPTION

Figure 1:
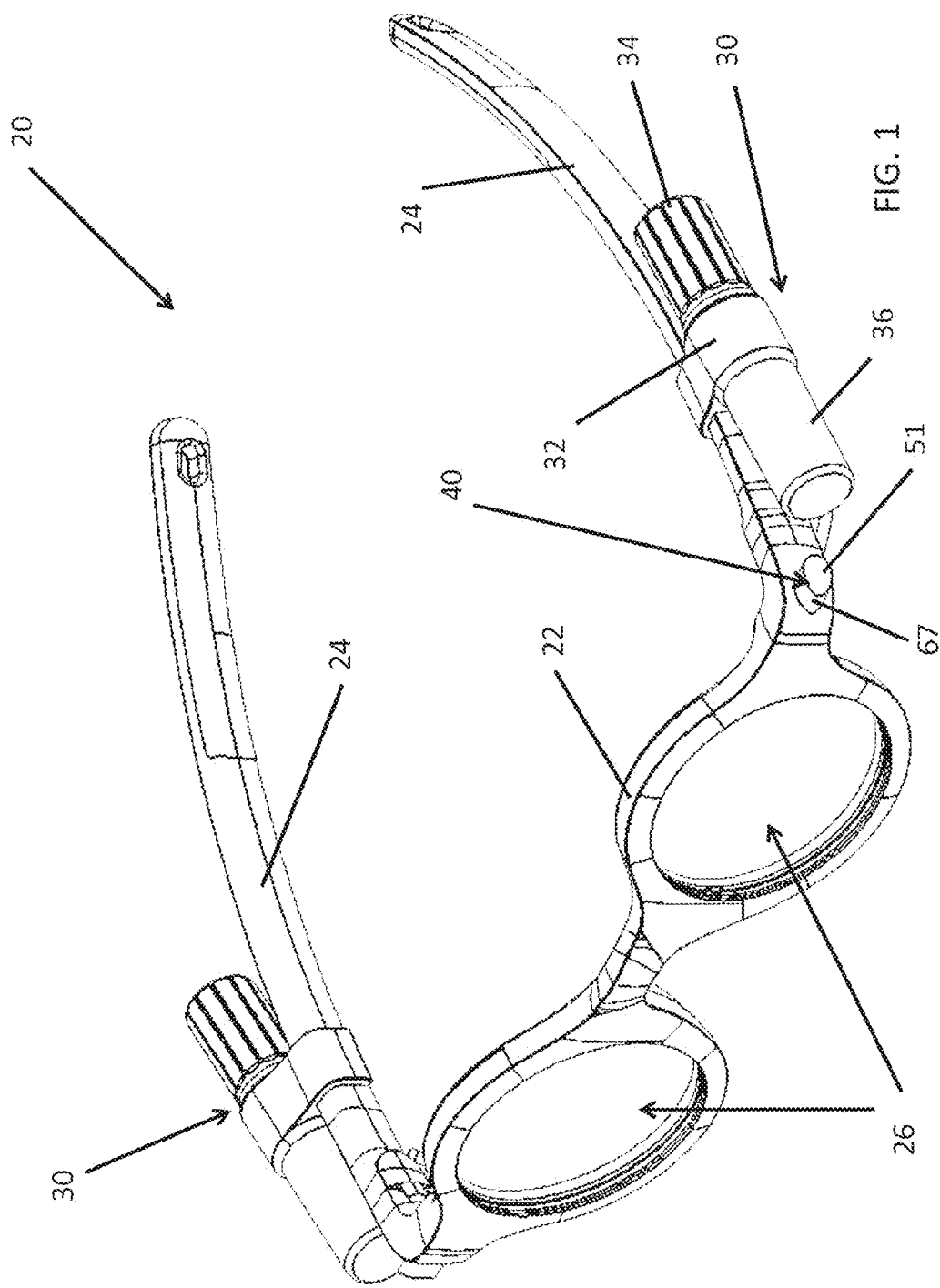
FIG. 1 is a perspective view of a set of adjustable eyeglasses constructed in accordance with the teachings of the present disclosure.

The following description is merely exemplary in nature and is in no way intended to limit the present disclosure or its application or uses. It should be understood that throughout the description, corresponding reference numerals indicate like or corresponding parts and features.

Referring to FIGS. 1-6, a set of adjustable eyeglasses according to the present disclosure is illustrated and generally indicated by reference numeral 20. As shown, the adjustable eyeglasses 20 comprise a frame member 22, two side arms 24 secured to the frame member 22, and two fluid-filled variable lenses 26 disposed within the frame member 22. The side arms 24 in one form are hingedly secured to the frame member 22 via hinge members 28 (shown best in FIG. 2), however, it should be understood that the side arms 24 may be fixed or secured to the frame member 22 in another manner while remaining within the scope of the present disclosure.

Figure 2:
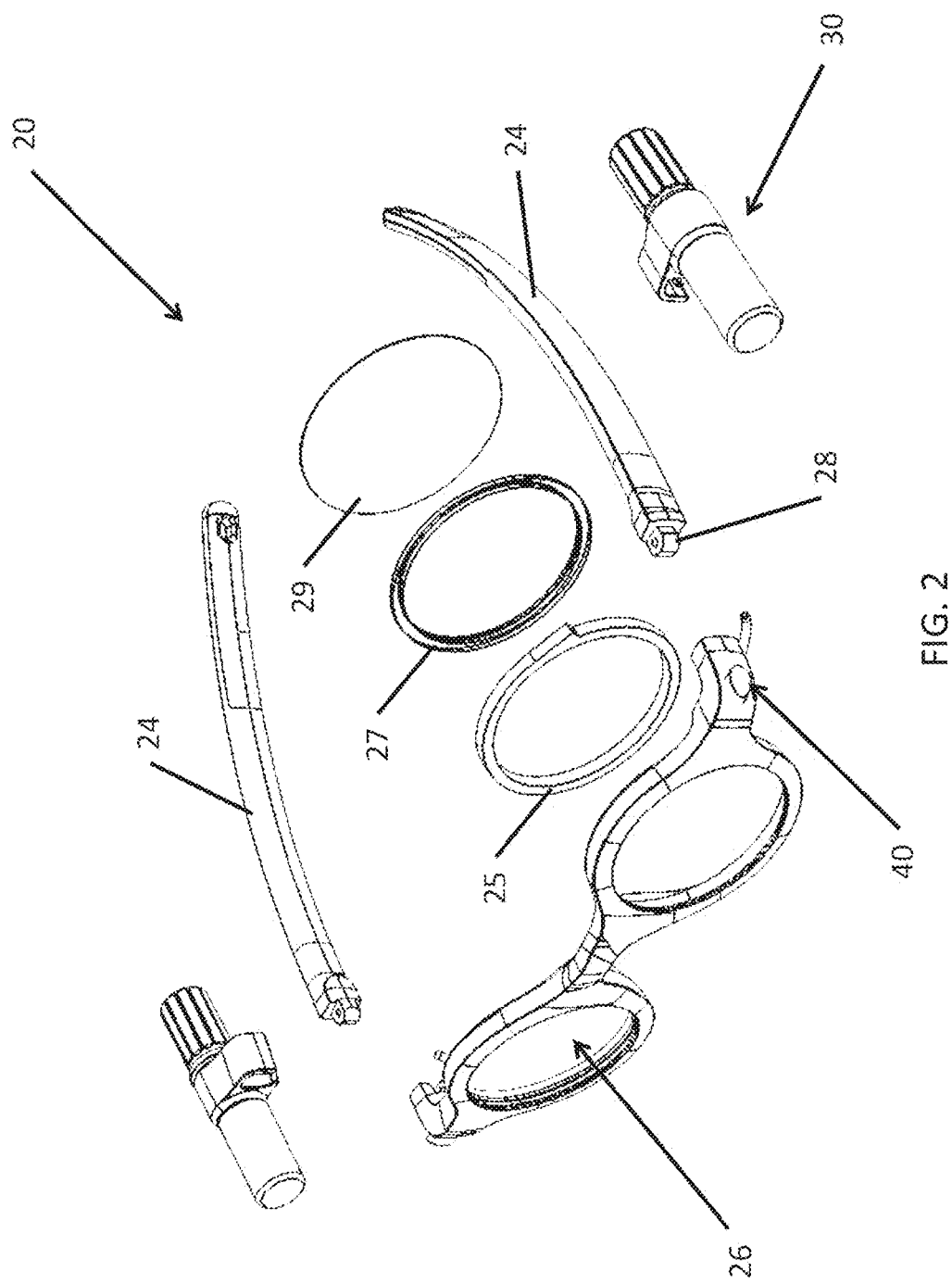
FIG. 2 is a partial exploded perspective view of the set of adjustable eyeglasses in accordance with the teachings of the present disclosure.

As shown in FIG. 2, the fluid-filled variable lenses 26 generally include a rigid lens 25, a support ring 27, and a flexible membrane 29 secured to the support ring. Further details of the construction and manufacturing of this fluid-filled variable lens 26 is described in greater detail in co-pending application titled "Method of Forming Variable Focus Eyewear," which is a continuation of PCT Application Serial No. PCT/US2013/032183, filed concurrently herewith and is commonly assigned with the present application, the contents of which are incorporated by reference herein in their entirety.

Two adjuster mechanisms 30 are removably secured to a portion of the adjustable eyeglasses 20. More specifically, in this form, the adjuster mechanisms 30 are removably secured to the side arms 24 using a flexible retaining clip 32. The adjuster mechanisms 30 generally include an actuator 34, which in this form is a hand-actuated knob that is turned in order to increase or decrease fluid pressure within a barrel 36. The actuator 34 in this form includes a textured outer surface as shown in order to provide an improved grip to the wearer for easier adjustment of the fluid pressure.

Figure 3:
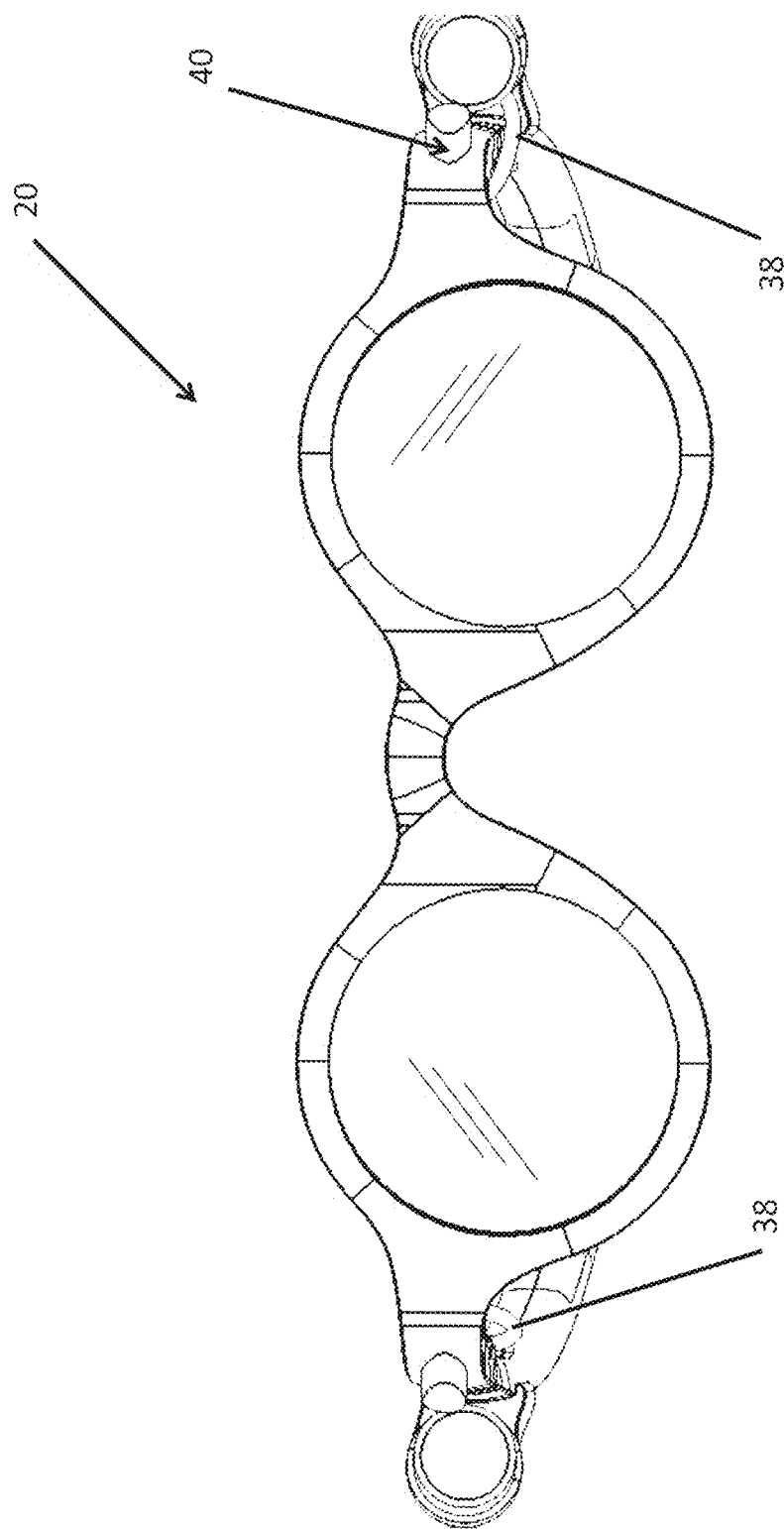
FIG. 3 is a front view of the set of adjustable eyeglasses in accordance with the teachings of the present disclosure.
Figure 4:
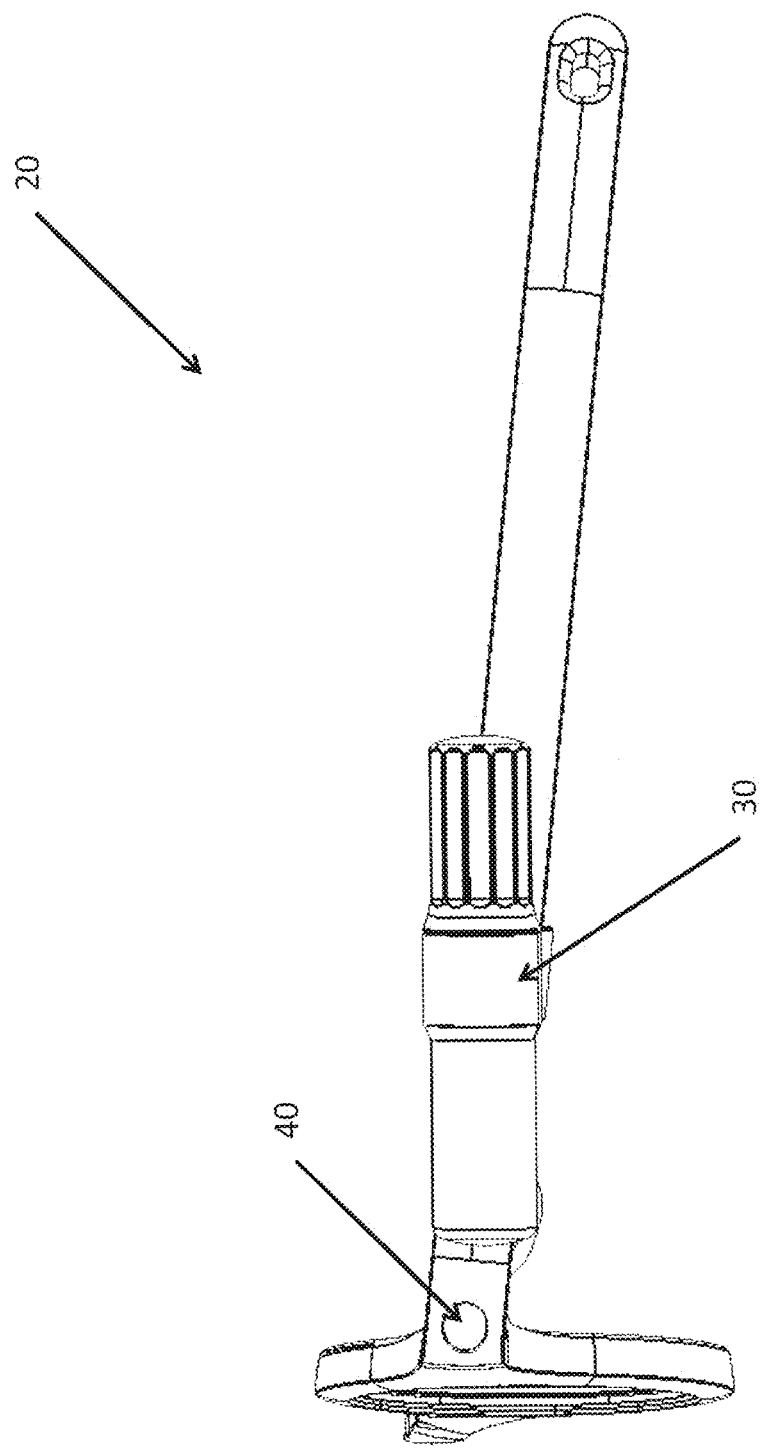
FIG. 4 is a side view of the set of adjustable eyeglasses in accordance with the teachings of the present disclosure.
Figure 5:
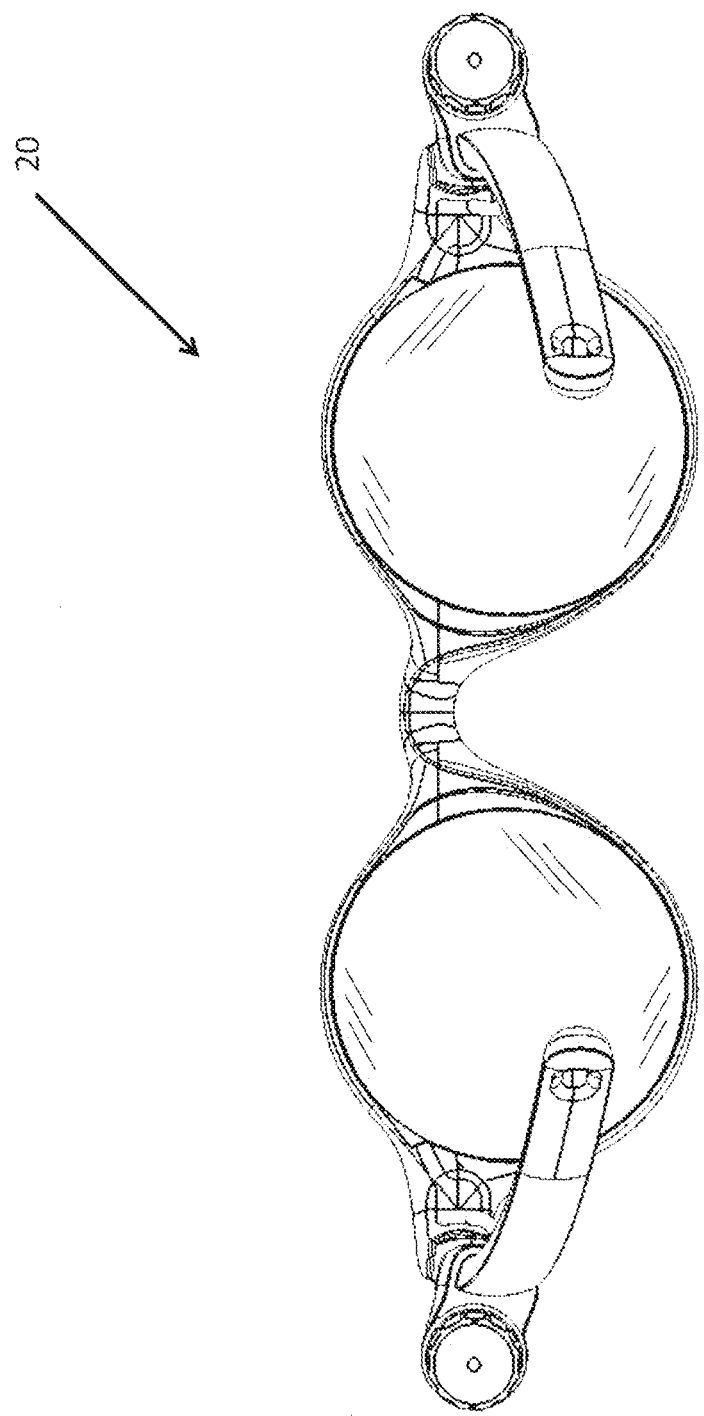
FIG. 5 is a rear view of the set of adjustable eyeglasses in accordance with the teachings of the present disclosure.
Figure 6:
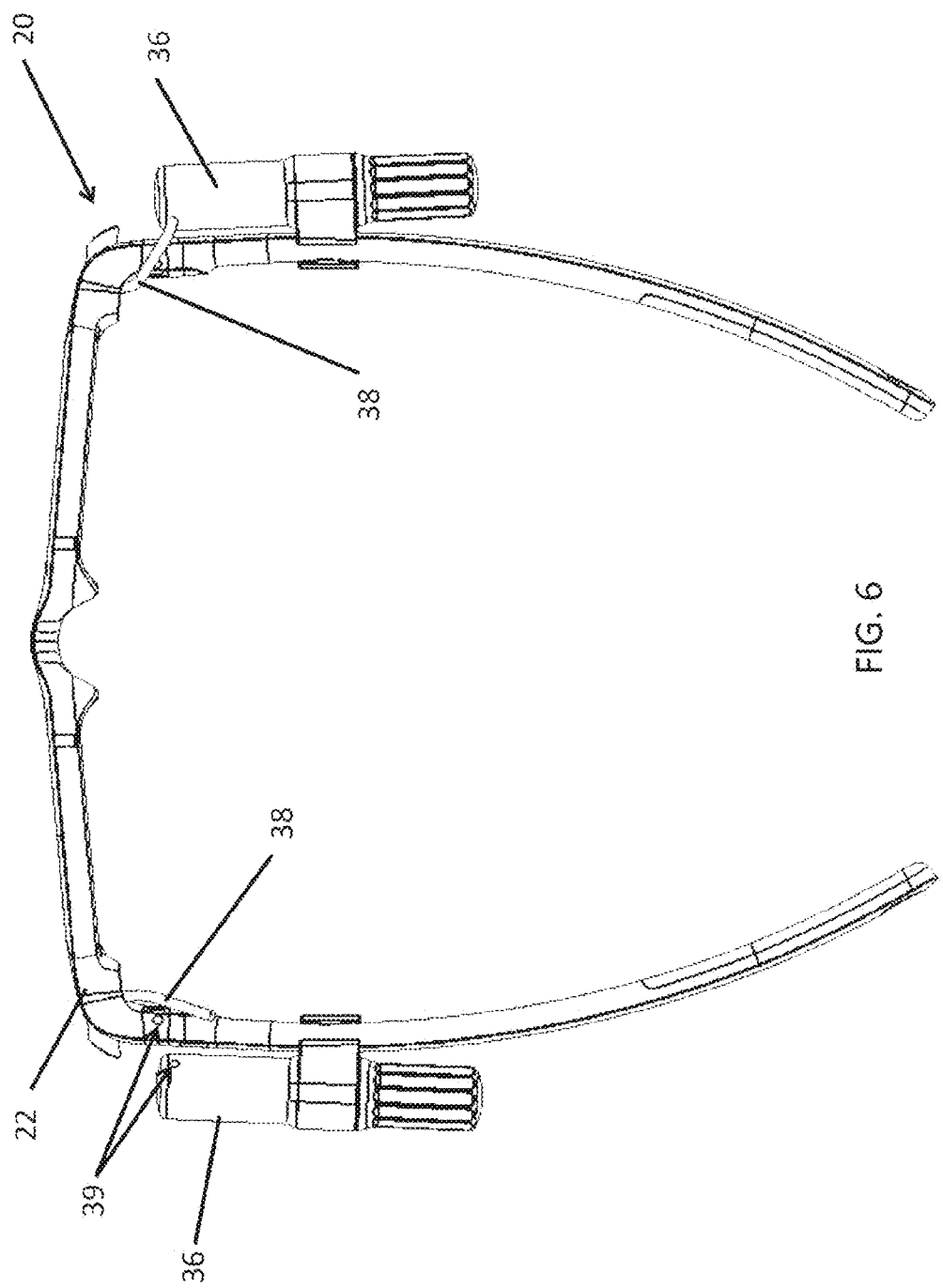
FIG. 6 is a bottom view of the set of adjustable eyeglasses in accordance with the teachings of the present disclosure.

As best seen in FIGS. 3 and 6, a connecting tube 38 extends from the barrel 36 and into the frame member 22. This connecting tube 38 is a conduit for the flow of a fluid from the adjuster mechanism 30 and into the fluid-filled variable lenses 26, and operation of which is described in greater detail below. The connecting tube 38 is generally sized to be placed into openings 39 formed in both the barrel 36 and in the frame 22, (shown on the left side of FIG. 6), and thus the connecting tubes 38 are readily installed and removed from the adjustable eyeglasses 20.

Two sealing devices 40 are disposed at opposed ends of the frame member 22, which are activated once the proper optical power is set. More specifically, the sealing devices 40 seal the fluid within the fluid-filled variable lenses 26 and enable removal of the connecting tube 38 and the adjuster mechanism 30. Advantageously, the sealing devices 40 are "tool-less" and do not require any tools such as a screwdriver or hexagonal key in order to seal the fluid within the fluid-filled variable lenses 26. The sealing devices 40 are simply operated by hand, and even operation of the sealing devices 40 are now described in greater detail with reference to FIGS. 7-9.

The sealing device 40 generally includes a guide member 42 having an internal cavity 44 and a passageway 46 intersecting the internal cavity 44 as shown. Although the passageway 46 is shown as intersecting the internal cavity 44 at a normal angle, or being perpendicular to the internal cavity 44, it should be understood that any number of orientations of the passageway 46 relative to the internal cavity 44 may be employed according to the teachings of the present disclosure.

A pinch member 50 is slidably engaged within the internal cavity 44 of the guide member 42. As shown when moving from FIG. 8a to FIG. 8b, a pinch member 50 is depressed and a portion of the pinch member 50 slides across the passageway 46 and into a portion 52 of the internal cavity 44 to deform and seal a first connecting tube 54 (or fluid tube) extending through the passageway 46. After the first connecting tube 54 is sealed, the second connecting tube 56 (previously illustrated as a connecting tube 38) may be removed as shown in FIG. 8b, along with the adjuster mechanism 30 as previously set forth.

Figure 7:
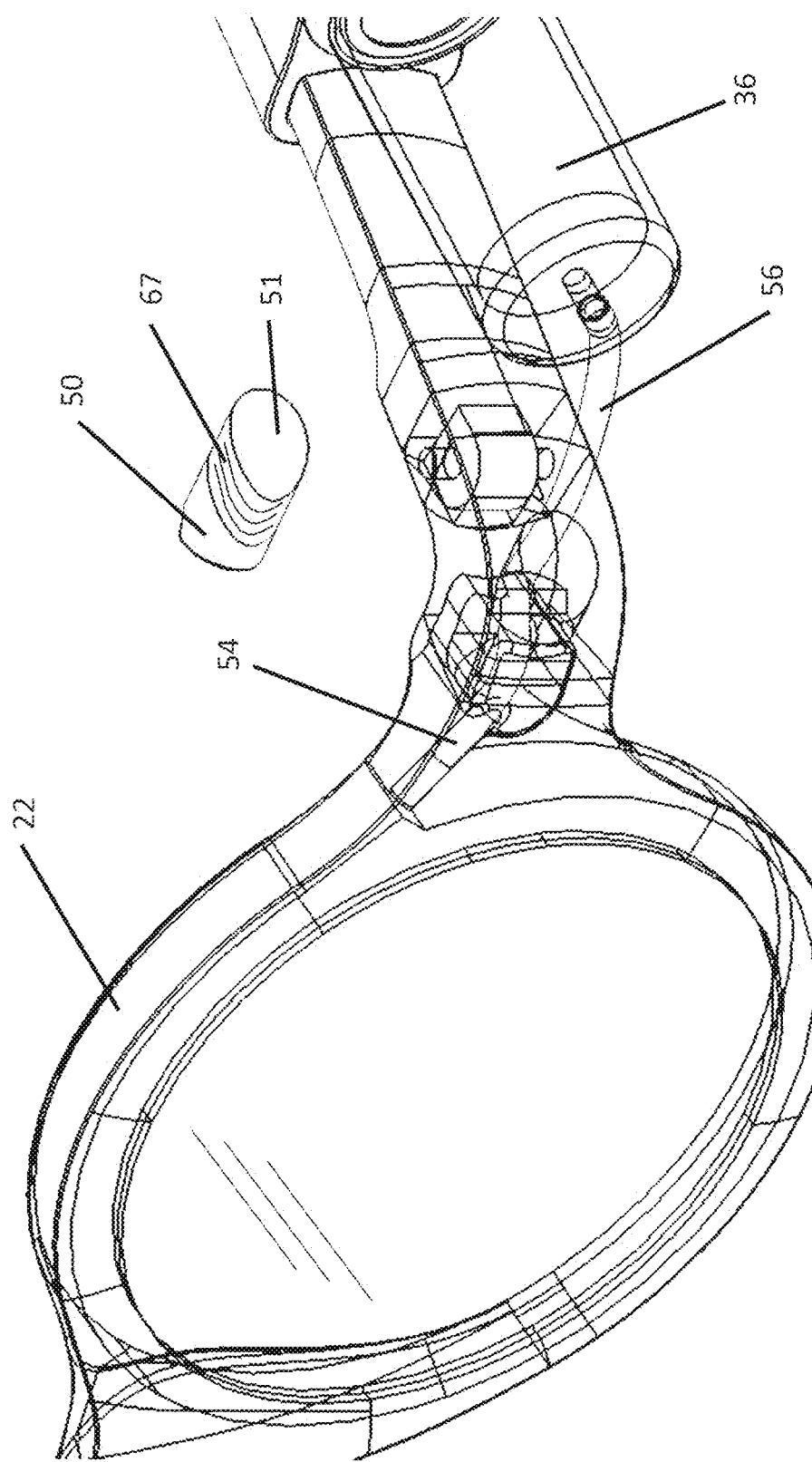
FIG. 7 is an enlarged perspective view illustrating one mounting configuration for a sealing device constructed in accordance with the teachings of the present disclosure.

The pinch member 50 in one form includes a flange 60 disposed around its proximal end portion 62, and the internal cavity 44 defines a corresponding shoulder 64 around its proximal end portion 66. (As used herein, the term "proximal" or "proximally" should be construed as in the direction of arrow X in FIG. 8a, and the term "distal" or "distally" should be construed as in the direction of arrow Y in FIG. 8a). As such, the flange 60 of the pinch member 50 abuts the shoulder 64 of the internal cavity 44, as shown in FIG. 8b, in order to limit distal travel of the pinch member 50. Additionally, the side surfaces 67 of this flange 60 in one form define a color that is different from a color of the frame member 22 and/or the side arms 24, such as a red color as indicated in FIGS. 1 and 7. As such, a visual indicia is provided when the pinch member 50 is in an open position (showing color) and when it is in a closed position (showing no color). It should also be understood that a separate button 51 as shown in FIG. 1-7 may be employed to activate the pinch member 50, and this separate button 51 may also be similarly colored.

As further shown, the pinch member 50 in one form defines a rounded edge 68 around its end face 70 in order to provide a smoother engagement with and to reduce the risk of puncturing the first connecting tube 54. Similarly, a distal internal edge 72 of the internal cavity 44 is also rounded for the same reason. It should be understood, however, that other geometries other than the rounded or radiused edges may be employed while remaining within the scope of the present disclosure. For example, a chamfer, or a polygonal surface may be employed in alternate forms of the present disclosure.

As shown in FIG. 9, the sealing device 40 includes both the first connecting tube 54 and the second connecting tube 56. In one form, the first connecting tube 54 is disposed within the second connecting tube 56 as shown and defines an interference fit. Accordingly, the second connecting tube 56 is plastically deformed to fit over the first connecting tube 54 as shown. As such, an air and fluid-tight interface is defined between the two tubes 54 and 56. It should also be understood that the first connecting tube 54 may be plastically deformed to fit over the second connecting tube 56, and the pinch member 50 may deform either of the tubes while remaining within the scope of the present disclosure. In one form, an overlap D of about 3-5 mm is provided between the first connecting tube 54 and a second connecting tube 56 to provide an adequate and robust seal. It should be understood, however, that other overlaps may be provided while remaining within the scope of the present disclosure. Furthermore, either or both of the first connecting tube 54 and the second connecting tube may be provided with a coating, such as a surface primer, in order to tightly secure the interface.

Referring back to FIG. 7, when assembled/secured to the frame member 22, the first connecting tube 54 is completely disposed within the frame member 22, while the second connecting tube 56 is mostly exposed between the frame member 22 and the barrel 36. The tubes 54 and 56 may be any material that is compatible with a silicone fluid that is used to fill the fluid-filled variable lenses 26. For example, such materials may include but are not limited to Nylon and fluoropolymers such as PTFE (polytetrafluoroethylene) or FEP (Fluorinated Ethylene Propylene). Additionally, it is contemplated that the tubes be made of different materials in order to reduce the risk of a permanent joint/bond being formed therebetween.

In an alternate form of the present disclosure, the second connecting tube 56 is a shrink fit material, such as a polyvinylidene fluoride, or polyvinylidene difluoride (PVDF), by way of example. As a shrink fit material, the overlap D is achieved more readily, and the second connecting tube 56 is less likely to become pinched or kinked.

Referring now to FIG. 10, both the internal cavity 44 and the pinch member 50 in one form of the present disclosure define a rectangular cross-section. Additionally, a gap 74 is defined between a wall 76 of the internal cavity 44 and a portion of the pinch member 50 extending therein. This gap 74, in one form, is less than approximately two times a wall thickness of the first connecting tube 54.

Turning to FIGS. 11a and 11b, the sealing device 40 may also include features to limit travel of the pinch member in a direction opposite its travel. For example, as shown in FIG. 11a, at least one extension 80 is defined on the pinch member 50 and a corresponding recess 82 in the internal cavity. As the pinch member 50 is depressed, the extension 80 engages the recess 82 to secure the pinch member 50 and to inhibit proximal travel. Although a barb configuration is shown in this form, it should be understood that at least one extension may be defined on either the pinch member or the internal cavity, and a corresponding recess defined on the other of the pinch member or the internal cavity. Accordingly, the specific configurations as illustrated and described herein should not be construed as limiting the scope of the present disclosure.

With the barb configuration as illustrated herein, and other configurations as well, a haptic feedback such as a "click" may be provided to the user in order to indicate that a sufficient seal has been made and thus allowing for safe removal of the second connecting tube 56 and the adjuster mechanism 30. Alternative forms of feedback may also be provided, such as an aural feedback, which may be provided with an internal microchip embedded within the sealing device 40.

As shown in FIG. 11b, a locking device 84 that is external to the sealing device 40 may be employed. In this form, the locking device 84 defines a pin or shaft that engages a corresponding hole or opening through the guide member 42 and the pinch member 50. Such a locking device 84 is merely exemplary and should not be construed as limiting the types of external locking devices that may be employed, including but not limited to magnetic means.

Figure 12:
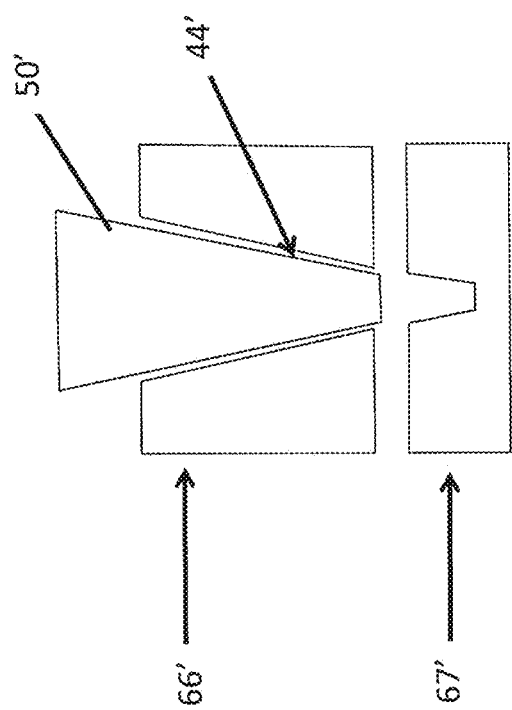
FIG. 12 is still another form of a sealing device defining a continuously tapered internal cavity and constructed in accordance with the teachings of the present disclosure.

Referring now to FIG. 12, an alternate form of the guide member 42' and the pinch member 50' are shown, which is defines an alternate geometry than the previously illustrated and described stepped configuration. As shown, the internal cavity 44' is continuously tapered from its proximal end portion 66' to its distal end portion 67'. The pinch member 50' is similarly tapered in order to limit its travel. Such form is just one of many that may be employed in order to carry out the teachings of the present disclosure, and thus it should be understood that the stepped and tapered configurations are merely exemplary and should not be construed as limiting the scope of the present disclosure.

Although only one internal cavity 44 and one pinch member 50 are shown and described, it should be understood that the sealing device may include more than one internal cavity 44 and a corresponding more than one members traversing therethrough to seal a connecting tube according to the teachings of the present disclosure. And although the guide member 42 is shown as a single unitized piece, it should be understood that the guide member 42 may be multiple pieces while remaining within the scope of the present disclosure. Both the guide member 42 and the pinch member 50 are in one form either a thermoset or a thermoplastic material such as a polycarbonate or a polypropylene.

Figure 13B:
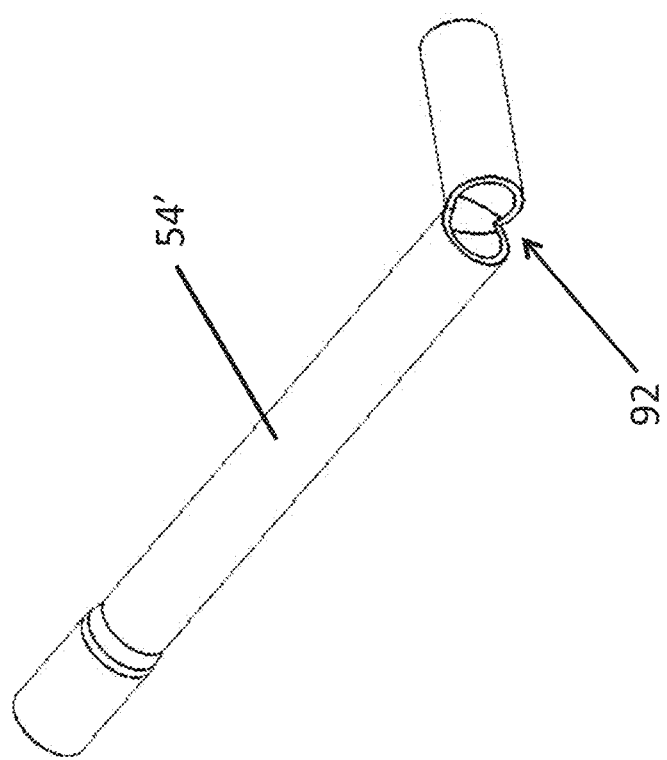
FIG. 13b is a perspective view of the first connecting tube of FIG. 13a having an incision and constructed in accordance with the teachings of the present disclosure.

Referring now to FIGS. 13a and 13b, another form of the first connecting tube 54' and the second connecting tube 56' are illustrated with the overlap D around a bend portion 90 of their assembly. In this form, as shown in FIG. 13b, the first connecting tube 54' defines an incision 92 at the bend portion 90, which is positioned within the overlap D. This incision 92 enables a tighter bend radius in a temple region of the wearer, which provides a more aesthetically pleasing appearance. In addition, the incision 92 provides for an improved connection, thus reducing the risk of the tubes 54' and 56' being inadvertently pulled apart.

Figure 14:
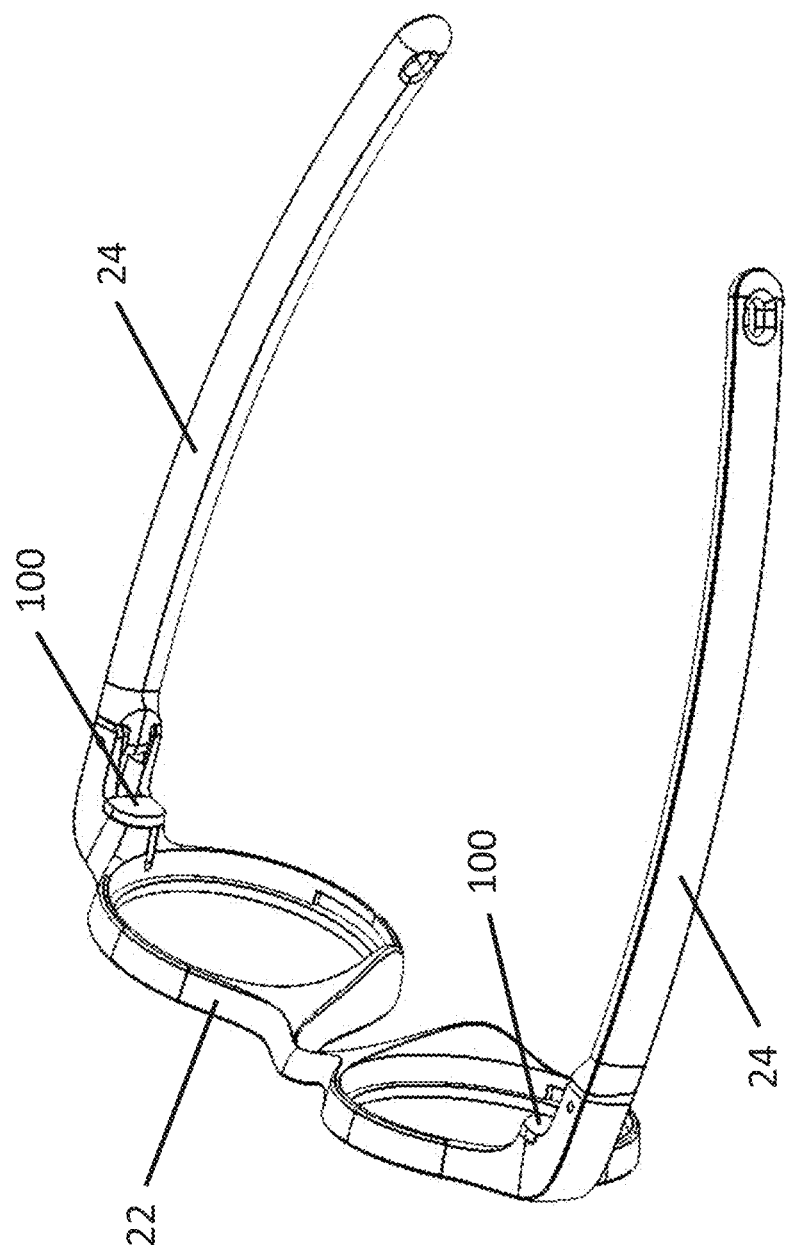
FIG. 14 is a perspective view of another form of a sealing button constructed in accordance with the teachings of the present disclosure.

Referring to FIG. 14, another form of a sealing button is illustrated and generally indicated by reference numeral 100. This sealing button 100 is located on a rear portion of the frame member 22 as shown and provides for a sealing plane that is relatively planar across the front of the eyeglasses. In this sealing location, the frame member 22 is more resistant to bending when the side arms 24 are opened outwards. Additionally, this geometry is more easily formed during molding and does not require a side core as with the previous form of the sealing button 51.

As further shown in FIG. 15, a metal component 120 is provided for a female component non-return, which lessens the geometric tolerances required within the frame 22.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A sealing device comprising:
    a guide member having at least one internal cavity and a passageway intersecting the internal cavity; and
    a pinch member slidably engaged within the internal cavity of the guide member,
    wherein a portion of the pinch member slides across the passageway and into a portion of the internal cavity to deform and seal a fluid tube extending through the passageway;
    wherein at least one extension is defined on one of the pinch member and the internal cavity, and a corresponding recess is defined in one of the other of the pinch member and the internal cavity, the extension engaging the recess to secure the pinch member and to inhibit proximal travel, and
    wherein a gap is defined between a wall of the internal cavity and a portion of the pinch member extending therein, the gap being less than approximately two times a wall thickness of the fluid tube.

2. The sealing device according to claim 1, wherein the pinch member defines a flange and the internal cavity defines a shoulder, wherein the pinch member flange abuts the internal cavity shoulder to limit travel of the pinch member.

3. The sealing device according to claim 1, wherein the pinch member defines an end face having a rounded edge.

4. The sealing device according to claim 1, wherein at least a portion of the intersection of the passageway and the internal cavity defines a rounded surface.

5. The sealing device according to claim 1, wherein the internal cavity and the pinch member define rectangular cross-sections.

6. The sealing device according to claim 1, wherein the extension defines a barb configuration.

7. The sealing device according to claim 1, wherein the guide member is a single unitized piece.

8. The sealing device according to claim 1, wherein the internal cavity of the guide member defines a stepped configuration from a proximal end portion to a distal end portion.

9. The sealing device according to claim 1, wherein the internal cavity is continuously tapered from a proximal end portion to a distal end portion.

10. The sealing device according to claim 1 further comprising:
    a first connecting tube extending through the passageway; and
    a second connecting tube secured to the first connecting tube,
    wherein the first connecting tube is disposed within the second connecting tube and defines an interference fit therebetween.

11. The sealing device according to claim 10, wherein the second connecting tube is shrink fit over the first connecting tube.

12. The sealing device according to claim 10, wherein the first connecting tube defines an incision at a bend portion.

13. The sealing device according to claim 1, wherein at least one of a haptic and an aural feedback is provided when the extension engages the recess.

14. A set of adjustable eyeglasses comprising:
    a frame member;
    two side arms secured to the frame member;
    two fluid-filled variable lenses disposed within the frame member;
    two adjuster mechanisms removably secured to a portion of the adjustable eyeglasses;
    two sets of connecting tubes extending from the adjuster mechanisms through the frame and into the fluid-filled variable lenses, each set of connecting tubes comprising a first tube disposed within a second tube and defining an interference fit therebetween; and
    two sealing devices disposed at opposed ends of the frame member, the sealing devices each comprising:
        a guide member having at least one internal cavity and a passageway intersecting the internal cavity;
        a pinch member slidably engaged within the internal cavity of the guide member and
        a locking device that limits travel of the pinch member in a direction opposite from a sealing direction of the pinch member,
    wherein a portion of the pinch member slides across the passageway to deform and seal at least one of the first connecting tube and the second connecting tube extending through the passageway and to allow for the removable detachment of at least one of the other of the first connecting tube and the second connecting tube.

15. The set of adjustable eyeglasses according to claim 14, wherein at least one extension is defined on one of the pinch member and the internal cavity, and a corresponding recess is defined in one of the other of the pinch member and the internal cavity, the extension engaging the recess to secure the pinch member and to inhibit proximal travel.

16. The set of adjustable eyeglasses according to claim 15, wherein the extension defines a barb configuration.

17. The set of adjustable eyeglasses according to claim 15, wherein at least one of a haptic and an aural feedback is provided when the extension engages the recess.

18. The set of adjustable eyeglasses according to claim 14, wherein the pinch member further comprises at least one surface defining a color different from a color of the frame member and a color of the side arms.

19. The set of adjustable eyeglasses according to claim 14, wherein the pinch member is located on a rear portion of the frame member and provides for a sealing plane that is relatively planar across a front of the eyeglasses.

20. A sealing device comprising:
    a guide member having at least one internal cavity and a passageway intersecting the internal cavity; and
    a pinch member slidably engaged within the internal cavity of the guide member,
    wherein a portion of the pinch member slides across the passageway and into a portion of the internal cavity to deform and seal a fluid tube extending through the passageway;
    wherein the internal cavity of the guide member defines a stepped configuration from a proximal end portion to a distal end portion.

21. The sealing device according to claim 20, wherein the internal cavity is continuously tapered from a proximal end portion to a distal end portion.

22. The sealing device according to claim 20 further comprising:
    a first connecting tube extending through the passageway; and
    a second connecting tube secured to the first connecting tube,
    wherein the first connecting tube is disposed within the second connecting tube and defines an interference fit therebetween.

* * * * *